US012766545B2

(12) United States Patent
Sung et al.

(10) Patent No.: US 12,766,545 B2
(45) Date of Patent: Oct. 20, 2026

(54) CONTROL DEVICE AND SUBSTRATE PROCESSING APPARATUS INCLUDING THE SAME

(71) Applicants: SEMES CO., LTD., Cheonan-si (KR); SAMSUNG ELECTRONICS CO., LTD., Suwon-si (KR)

(72) Inventors: Jin Yeong Sung, Cheonan-si (KR); Ki Hoon Choi, Cheonan-si (KR); Seung Un Oh, Cheonan-si (KR); Young Ho Park, Incheon (KR); Sang Hyeon Ryu, Cheonsan-si (KR); Jang Jin Lee, Seoul (KR); Hyun Yoon, Seoul (KR); Sang Gun Lee, Seoul (KR); Yu Jin Cho, Cheonan-si (KR); Ho Jong Hwang, Cheonan-si (KR); Jong Ju Park, Suwon-si (KR); Jong Keun Oh, Suwon-si (KR); Yong Woo Kim, Suwon-si (KR)

(73) Assignees: Semes Co., Ltd. (KR); Samsung Electronics Co., Ltd. (KR)

( * ) Notice: Subject to any disclaimer, the term of this patent is extended or adjusted under 35 U.S.C. 154(b) by 317 days.

(21) Appl. No.: 18/768,390

(22) Filed: Jul. 10, 2024

(65) Prior Publication Data

US 2025/0073742 A1 Mar. 6, 2025

(30) Foreign Application Priority Data

Aug. 31, 2023 (KR) ........................ 10-2023-0115188

(51) Int. Cl.

*B05C 13/00* (2006.01)
*G05B 19/401* (2006.01)
(Continued)

(52) U.S. Cl.

CPC ............ *B05C 13/00* (2013.01); *G05B 19/401* (2013.01); *G05B 19/404* (2013.01); *G06T 7/74* (2017.01)

(58) Field of Classification Search

CPC .... B05C 13/00; G05B 19/401; G05B 19/404; G06T 7/74
See application file for complete search history.

(56) References Cited

U.S. PATENT DOCUMENTS 5,745,242 A 4/1998 Hata
7,542,150 B2 6/2009 Lee
(Continued)

FOREIGN PATENT DOCUMENTS

JP H08122019 A 5/1996
JP 2921129 B2 7/1999
(Continued)

*Primary Examiner* — Ziaul Karim
(74) *Attorney, Agent, or Firm* — Myers Bigel, P.A.

(57) ABSTRACT

Provided is a control device and a substrate processing apparatus including the same. The substrate processing apparatus includes a support unit configured to support and rotate a first substrate, the support unit including a spin chuck, a spray unit configured to spray a processing fluid on the first substrate, a correction unit on a swing arm and configured to irradiate a beam onto the first substrate when the processing fluid is provided on the first substrate, wherein the swing arm is adjacent to the spin chuck and is configured to move the correction unit to a target point on the first substrate, and a controller configured to control the spin chuck and the swing arm, and correct a position error of the swing arm using a second substrate, wherein a plurality of anchor patterns are on the second substrate.

20 Claims, 11 Drawing Sheets

(51) Int. Cl.
*G05B 19/404* (2006.01)
*G06T 7/73* (2017.01)

(56) References Cited

U.S. PATENT DOCUMENTS

| | | | | |
|---|---|---|---|---|
| 7,664,309 | B2 | 2/2010 | Horie et al. | |
| 9,753,366 | B2 | 9/2017 | Dmitriev | |
| 11,139,180 | B2 * | 10/2021 | Yoshihara | B08B 3/10 |
| 11,961,744 | B2 * | 4/2024 | Fukatsu | B05C 11/00 |
| 2005/0115671 | A1 * | 6/2005 | Araki | B08B 7/04 257/E21.228 |
| 2007/0179658 | A1 * | 8/2007 | Hamada | G05B 19/4184 700/121 |
| 2010/0237469 | A1 | 9/2010 | Saito et al. | |
| 2018/0033605 | A1 * | 2/2018 | Ota | H10P 14/6518 |
| 2023/0084076 | A1 | 3/2023 | Yoon et al. | |

FOREIGN PATENT DOCUMENTS

| | | | |
|---|---|---|---|
| JP | 2023042908 | A | 3/2023 |
| KR | 20140126341 | A | 10/2014 |
| KR | 20150076809 | A | 7/2015 |
| KR | 101640262 | B1 | 7/2016 |
| KR | 20180021920 | A | 3/2018 |
| KR | 20200010988 | A | 1/2020 |
| KR | 20230100219 | A | 7/2023 |

* cited by examiner

CONTROL DEVICE AND SUBSTRATE PROCESSING APPARATUS INCLUDING THE SAME

REFERENCE TO RELATED APPLICATIONS

This application claims the benefit of priority under 35 U.S.C. § 119 to Korean Patent Application No. 10-2023-0115188, filed on Aug. 31, 2023, in the Korean Intellectual Property Office, the disclosure of which is incorporated herein by reference in its entirety.

BACKGROUND

The present disclosure relates to a centering method applied to equipment for correcting critical dimensions of a mask or reticle, a computer program executing the method, a control device equipped with a processor executing the computer program, and a substrate processing apparatus including the same.

In the photolithography process, a circuit pattern can be formed in a semiconductor device using a mask. In order to produce semiconductor devices with high precision and uniformity, the pattern line width of the semiconductor device can be checked and the critical dimension (CD) of the mask can be corrected.

Equipment that corrects the critical dimensions of the mask may use a swing stage equipped with a swing arm and spin chuck due to space issues within the chamber and contamination risk. However, if the movement trajectory of the swing arm does not pass through the rotation center of the spin chuck, a dead zone that cannot be etched may occur on the mask.

SUMMARY

The technical problem to be solved by the present disclosure is to provide a control device that corrects the absolute position error of the rotation motor of a swing arm using an anchor pattern and a substrate processing apparatus including the same.

The technical objects of the present disclosure are not limited to the technical problem mentioned above, and other technical objects not mentioned will be more clearly understood by those skilled in the art from the description below.

According to aspects of the present disclosure, an apparatus for processing a substrate includes a support unit configured to support and rotate a first substrate, the support unit including a spin chuck, a spray unit configured to spray a processing fluid on the first substrate, a correction unit on a swing arm and configured to irradiate a beam onto the first substrate when the processing fluid is provided on the first substrate, wherein the swing arm is adjacent to the spin chuck and is configured to move the correction unit to a target point on the first substrate, and a controller configured to control the spin chuck and the swing arm, and correct a position error of the swing arm using a second substrate, wherein a plurality of anchor patterns are on the second substrate.

According to aspects of the present disclosure, a control device is configured to control a spin chuck and a swing arm, the spin chuck configured to support and rotate a first substrate, and the swing arm configured to move to a target point on the first substrate, wherein the control device is further configured to correct a position error of the swing arm using a second substrate having a plurality of anchor patterns thereon, generate an error correction model by Fourier transforming a function related to a swing direction error of the swing arm according to a rotation angle of the swing arm, extract a fitting parameter using the error correction model, and further correct the position error of the swing arm through curve fitting based on the fitting parameter.

According to aspects of the present disclosure, an apparatus for processing a substrate includes a support unit configured to support and rotate a first substrate, the support unit including a spin chuck, a spray unit configured to spray a processing fluid on the first substrate, a correction unit on a swing arm and configured to irradiate a beam onto the first substrate when the processing fluid is provided on the first substrate, wherein the swing arm is adjacent to the spin chuck and is configured to move the correction unit to a target point on the first substrate, and a controller configured to control the spin chuck and the swing arm, correct a position error of the swing arm using a second substrate having a plurality of anchor patterns thereon, generate an error correction model by Fourier transforming a function related to a swing direction error of the swing arm according to a rotation angle of the swing arm, extract a fitting parameter using the error correction model, further correct the position error of the swing arm through curve fitting based on the fitting parameter, and verify whether the position error of the swing arm has been corrected, wherein each of the anchor patterns has a predetermined coordinate value.

Specific details of other embodiments are included in the detailed description and drawings.

BRIEF DESCRIPTION OF THE DRAWINGS

The above aspects and other aspects of the present disclosure will become apparent and more readily appreciated from the following description of the embodiments, taken in conjunction with the accompanying drawings in which.

DETAILED DESCRIPTION

Figure 1:
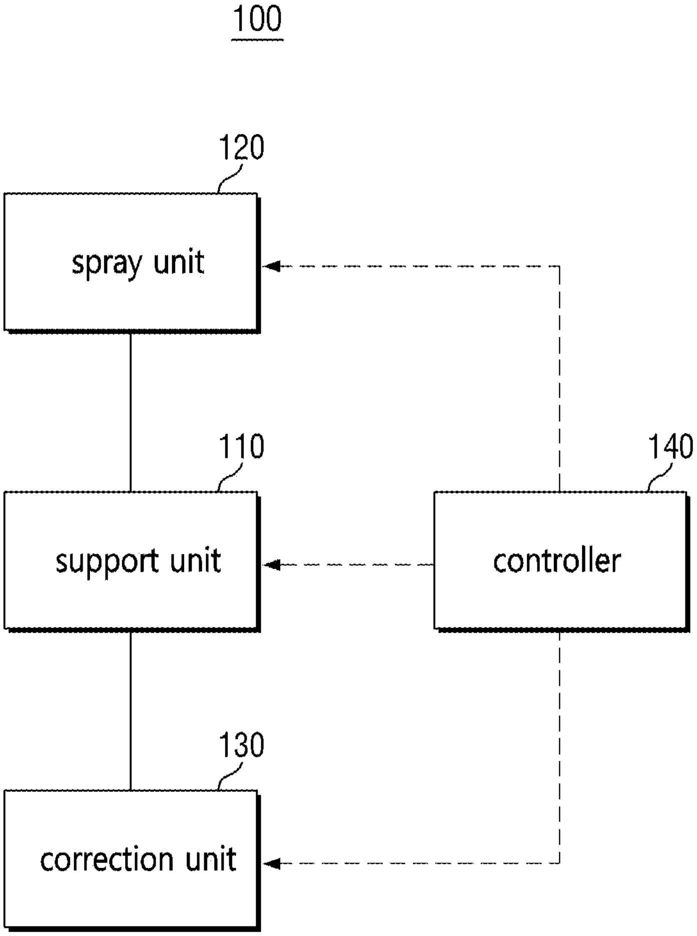
FIG. 1 is a block diagram schematically showing the internal structure of a substrate processing apparatus.

Hereinafter, example embodiments of the present disclosure will be described in detail with reference to the attached drawings. The same reference numerals are used for the same components in the drawings, and duplicate descriptions thereof are omitted.

FIG. 1 is a block diagram schematically showing the internal structure of a substrate processing apparatus. Referring to FIG. 1, the substrate processing apparatus 100 may include a support unit 110, a spray unit 120, a correction unit 130, and a controller 140.

In some embodiments, the substrate processing apparatus 100 may perform a wet etching process on a substrate. In some embodiments, the substrate processing apparatus 100 may perform a wet cleaning process on the substrate. The substrate processing apparatus 100 may be applied to a photo-lithography process.

The substrate processing apparatus 100 may correct the critical dimension (CD) of the substrate using a beam. For example, the substrate processing apparatus 100 may use an extreme ultra violet (EUV) beam to correct the critical dimension. The substrate can be used to manufacture semiconductor devices or apparatuses. For example, the substrate may be a mask, photomask, reticle, etc.

The support unit 110 may support the substrate when processing the substrate. The support unit 110 may support the substrate when spraying chemicals on the substrate. The support unit 110 may support the substrate when correcting the critical dimension of the substrate using a beam.

The support unit 110 may be provided as a swing type stage. The support unit 110 may include a spin chuck or a rotation chuck. For example, the support unit 110 may include a spin chuck 221, a rotation shaft 222, a rotation driving part 223, a support pin 224, and a guide pin 225 (e.g., see FIG. 2).

Figure 2:
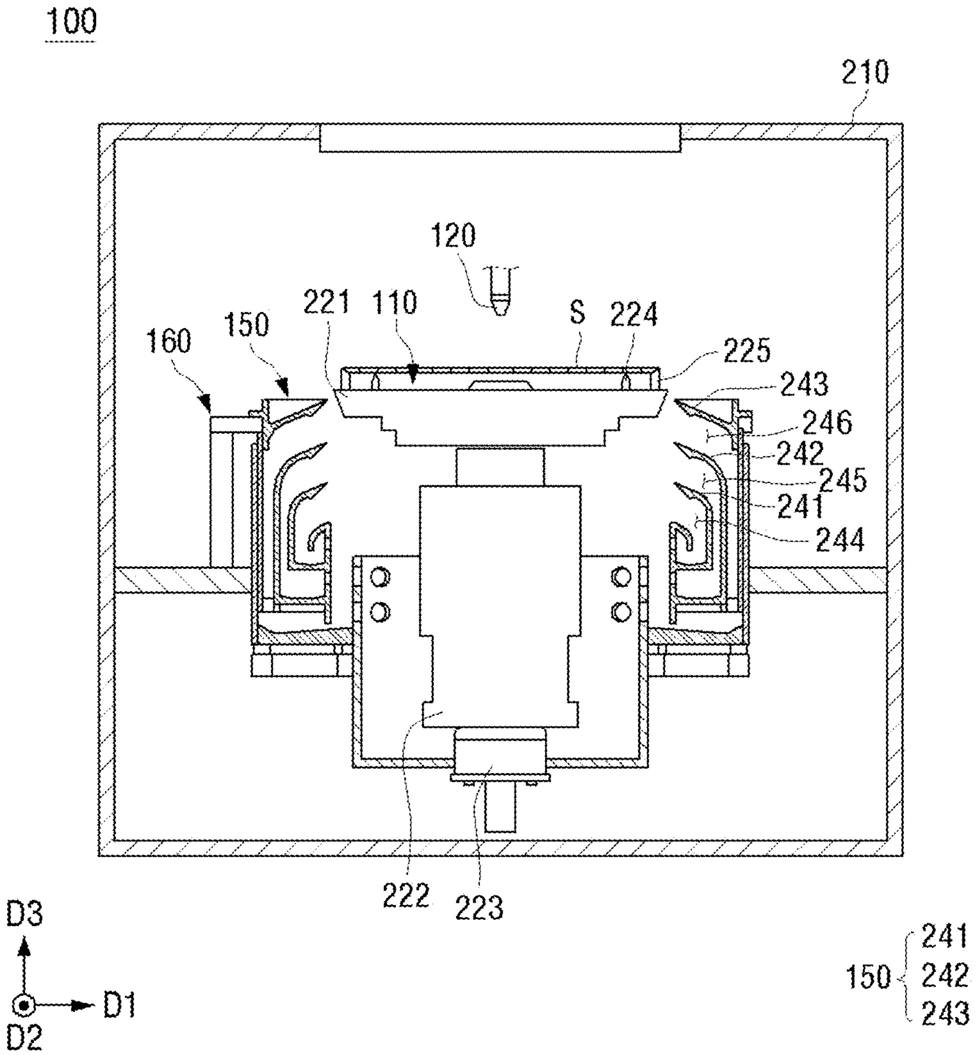
FIG. 2 is a first example diagram for explaining the internal configuration of a substrate processing apparatus.
Figure 3:
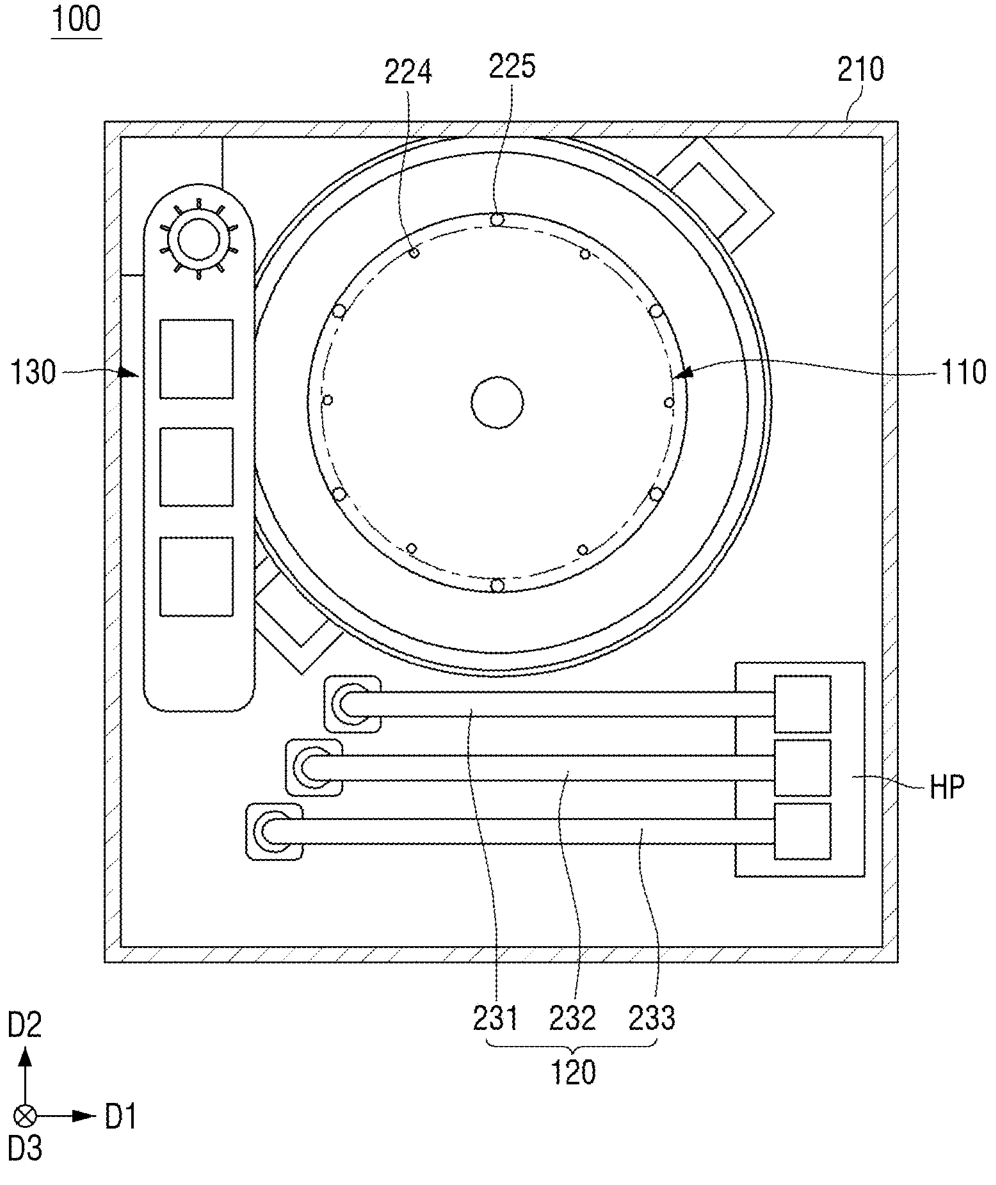
FIG. 3 is a second example diagram for explaining the internal configuration of a substrate processing apparatus.

FIG. 2 is a first example diagram for explaining the internal configuration of a substrate processing apparatus. FIG. 3 is a second example diagram for explaining the internal configuration of a substrate processing apparatus.

Referring to FIGS. 2 and 3, a first direction D1 and a second direction D2 constitute a plane. For example, the first direction D1 may be a front-back direction, and the second direction D2 may be a left-right direction. Alternatively, the first direction D1 may be a left-right direction, and the second direction D2 may be a front-back direction. For example, the first direction D1 and the second direction D2 may be horizontal directions. A third direction D3 is a height direction and is perpendicular to the plane formed by the first direction D1 and the second direction D2. The third direction D3 may be a vertical direction.

The support unit 110 may be provided within a chamber housing 210. The spray unit 120 and the correction unit 130 may be provided on the chamber housing 210. The chamber housing 210 may provide a space for processing a substrate S. However, the present disclosure is not limited thereto, and the support unit 110, the spray unit 120, and the correction unit 130 may also be provided within the chamber housing 210.

The spin chuck 221 may be provided so that the substrate S can be seated on the spin chuck 221. The spin chuck 221 may rotate according to the operation of the rotation shaft 222. The substrate S may rotate together with the spin chuck 221 while being seated on the spin chuck 221. The spin chuck 221 may rotate clockwise. Alternatively, the spin chuck 221 may rotate counterclockwise.

The spin chuck 221 may have a different planar shape from the substrate S. For example, in some embodiments, the spin chuck 221 is formed in a cylindrical structure, and its planar shape may be circular. On the other hand, the substrate S may have a square planar shape. However, the present disclosure is not limited thereto, and the spin chuck 221 may have the same planar shape as the substrate S.

The rotation shaft 222 may generate rotation force using electrical energy provided from the rotation driving part 223. The rotation shaft 222 may provide rotation force to the spin chuck 221 to rotate the spin chuck 221.

The support pin 224 and the guide pin 225 may be provided on the spin chuck 221 to support the substrate S. The support pin 224 may support the bottom surface of the substrate S so that the substrate S does not contact the upper surface of the spin chuck 221. The guide pin 225 may support the side surface of the substrate S to fix the position of the substrate S on the spin chuck 221. The guide pin 225 may operate as a chucking pin. The guide pin 225 may support the side surface of the substrate S so that the substrate S does not deviate from the spin chuck 221 when the spin chuck 221 rotates.

The support pin 224 and the guide pin 225 may be provided in the upper edge area of the spin chuck 221. A plurality of support pins 224 and guide pins 225 may be provided, but the present disclosure is not necessarily limited thereto. When provided in plural, the support pins 224 and the guide pins 225 may be arranged to have an annular ring shape.

Referring to FIGS. 1 to 3, the spray unit 120 sprays a processing fluid on the substrate S. The spray unit 120 may include a plurality of nozzles, but is not limited thereto and may also include a single nozzle. When the spray unit 120 includes a plurality of nozzles, each nozzle may spray a different processing fluid. For example, the spray unit 120 may include a first nozzle 231, a second nozzle 232, and a third nozzle 233.

Referring to FIG. 3, the first nozzle 231, the second nozzle 232, and the third nozzle 233 may move to the process position or the home port HP. The process position refers to the upper area of the substrate S. The first nozzle 231, the second nozzle 232, and the third nozzle 233 may spray processing fluid on the substrate S after moving to the process position. The home port HP is disposed in an outer area outside the top of the substrate S. The first nozzle 231, the second nozzle 232, and the third nozzle 233 may spray the processing fluid on the substrate S and then move to the home port HP to wait.

The first nozzle 231, the second nozzle 232, and the third nozzle 233 may rotate to move from the process position to the home port HP. The first nozzle 231, the second nozzle 232, and the third nozzle 233 may rotate and then move up and down in the home port HP. The first nozzle 231, the second nozzle 232, and the third nozzle 233 may rotate after being raised and lowered from the process position.

The first nozzle 231, the second nozzle 232, and the third nozzle 233 may rotate to move from the home port HP to the process position. The first nozzle 231, the second nozzle 232, and the third nozzle 233 may rotate and then move up and down in the process position. The first nozzle 231, the second nozzle 232, and the third nozzle 233 may rotate after being raised and lowered from the home port HP.

The first nozzle 231 may spray a first processing fluid. The second nozzle 232 may spray a second processing fluid. The third nozzle 233 may spray a third processing fluid. In some embodiments, the first processing fluid, the second processing fluid and the third processing fluid may be the same material. In some embodiments, the first processing fluid, the second processing fluid, and the third processing fluid may be different materials. In some embodiments, some of the first processing fluid, the second processing fluid, and the third processing fluid may be the same material and others may be different materials.

The first processing fluid may be an alkaline chemical liquid. For example, the first nozzle 231 may spray a first standard cleaning liquid. The first standard cleaning liquid may be an aqueous liquid containing hydrogen peroxide ($H_2O_2$) and ammonium hydroxide ($NH_4OH$). The second processing fluid may be an aqueous liquid diluted with an alkaline chemical. For example, the second nozzle 232 may spray hydrogen water (H2W). The first processing fluid and the second processing fluid may be provided simultaneously on the substrate S. However, the present disclosure is not limited thereto, and the first processing fluid and the second processing fluid may be provided on the substrate S with a time difference (i.e., may be provided on the substrate S at different times). The third processing fluid may be a rinse liquid. For example, the third nozzle 233 may spray deionized water (DIW).

Although not shown in FIG. 1, the substrate processing apparatus 100 may further include a recovery unit 150 and an elevation unit 160.

Referring back to FIG. 2, the recovery unit 150 may be provided to surround the support unit 110. It will be understood that "an element A surrounds an element B" (or similar language) as used herein means that the element A is at least partially around the element B but does not necessarily mean that the element A completely encloses the element B. The recovery unit 150 may recover the processing liquid used to process the substrate S. When the support unit 110 rotates while the substrate S is fixed on the support unit 110, the spray unit 120 may spray the processing liquid on the substrate S. The processing liquid discharged on the substrate S may be bounced in the direction where the recovery unit 150 is located due to centrifugal force generated as the support unit 110 rotates. The recovery unit 150 can recover the processing liquid dispersed in all directions through the inlet.

The recovery unit 150 may include a plurality of recovery ducts. The recovery unit 150 can recover different types of processing liquids into different recovery ducts to enable reuse of the processing liquids. For example, the recovery unit 150 may include a first recovery duct 241, a second recovery duct 242, and a third recovery duct 243. The first recovery duct 241, the second recovery duct 242, and the third recovery duct 243 may have the shape of a bowl.

The first recovery duct 241, the second recovery duct 242, and the third recovery duct 243 can recover different types of processing liquids. For example, the first recovery duct 241 may recover the third processing fluid, the second recovery duct 242 may recover the first processing fluid, and the third recovery duct 243 may recover the second processing fluid. The first recovery duct 241 may recover the third processing fluid through a first inlet 244. The second recovery duct 242 may recover the first processing fluid through a second inlet 245. The third recovery duct 243 may recover the second processing fluid through a third inlet 246.

Although not shown in FIG. 2, the first recovery duct 241, the second recovery duct 242, and the third recovery duct 243 may each be connected to a recovery line. The processing liquid recovered through the first recovery duct 241, the second recovery duct 242, and the third recovery duct 243 may be reused through the processing liquid regeneration unit.

The first recovery duct 241, the second recovery duct 242, and the third recovery duct 243 may be provided in an annular ring shape. The first recovery duct 241 may be installed to surround the support unit 110. The second recovery duct 242 may be installed to surround the first recovery duct 241. The third recovery duct 243 may be installed to surround the second recovery duct 242.

Meanwhile, when the spray unit 120 includes a single nozzle, the recovery unit 150 may include a single recovery duct. The recovery unit 150 may be equipped with a recovery duct corresponding to the number of nozzles in the spray unit 120.

The elevation unit 160 may elevate the recovery unit 150. The elevation unit 160 may simultaneously elevate the first recovery duct 241, the second recovery duct 242, and the third recovery duct 243. The elevation unit 160 may adjust the height of the recovery unit 150 so that the processing liquid can be recovered into the corresponding recovery ducts 241, 242, and 243 through the corresponding inlets 244, 245, and 246, depending on the type of processing liquid.

Referring to FIGS. 1 to 3, the correction unit 130 may correct information related to pattern elements formed on the substrate S using a beam. For example, the correction unit 130 may correct the critical dimension of the pattern element using a laser beam. Hereinafter, a mask will be described as a non-limiting example of the substrate S. In the present disclosure, the substrate S is not limited to the mask. The substrate S may also be referred to as a first substrate S.

Figure 4:
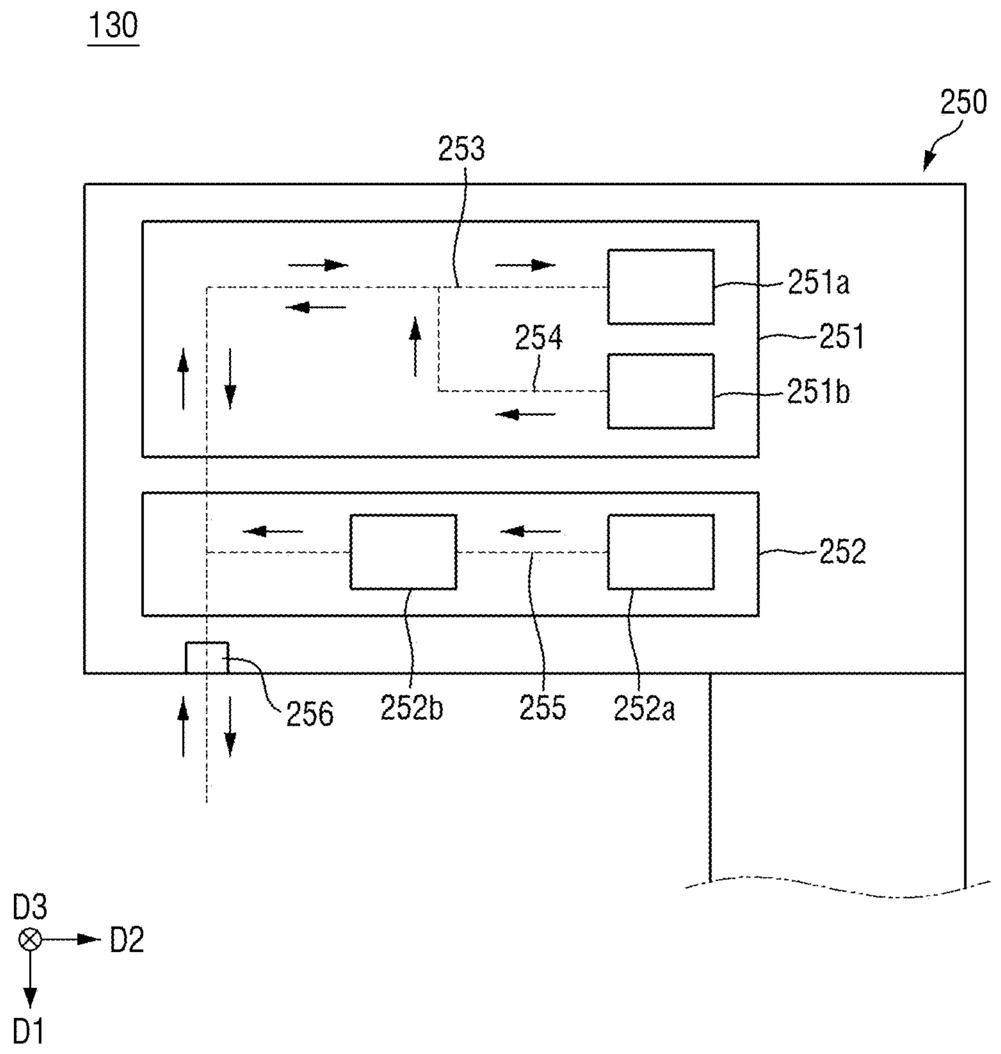
FIG. 4 is an example diagram for explaining the internal structure of a correction unit constituting a substrate processing apparatus.

The correction unit 130 may include an image acquisition module 251 and a beam irradiation module 252 to correct critical dimensions of pattern elements formed on the mask (e.g., see FIG. 4). The image acquisition module 251 and the beam irradiation module 252 may be mounted within a swing arm 250. For example, the swing arm 250 may be adjacent to the spin chuck 221 and may move the correction unit 130 to a target point on the substrate S. The correction unit 130 may be on the swing arm 250 and may irradiate a beam onto the substrate S when processing fluid is provided on the substrate S (e.g., provided by the spray unit 120). As used herein, the term "module" refers to a physical structure that may be composed of one or more mechanical and/or electrical elements and is not intended to be limiting to the physical structure. The term "module" may be synonymous, at least, with "part", "subassembly", "apparatus", "machine", or "device".

FIG. 4 is an example diagram for explaining the internal structure of a correction unit constituting a substrate processing apparatus.

Referring to FIG. 4, the image acquisition module 251 may acquire a surface image of the mask. The surface image of the mask may include a pattern shape formed on the mask. Using the surface image of the mask, the line width of the pattern formed on the mask can be identified.

The image acquisition module 251 may be provided as a vision system including a vision camera. The image acquisition module 251 may include a camera sensor 251*a* and a lamp 251*b*. The lamp 251*b* may illuminate the surface of the mask along a second optical path 254. The lamp 251*b* may be provided as an LED, for example. The camera sensor 251*a* may acquire a surface image of the mask while the lamp 251*b* is operating. The camera sensor 251*a* may acquire a surface image of the mask based on an optical signal flowing in through an optical entrance 256 and moving along a first optical path 253. Although not shown in FIG. 4, the image acquisition module 251 may further include a lens, a mirror, etc. on the first optical path 253 and the second optical path 254.

The beam irradiation module 252 may irradiate a laser beam to the surface of the mask. For example, the beam irradiation module 252 may irradiate a laser beam in the 500 nm to 550 nm wavelength band. The beam irradiation module 252 may irradiate a laser beam onto the surface of the mask when processing fluid is provided on the mask. The beam irradiation module 252 may irradiate a laser beam along a third optical path 255.

The beam irradiation module 252 can locally heat a designated position on the mask based on information provided by the surface image of the mask. The laser beam can activate the processing fluid on the mask and increase the etch or clean efficiency of the mask. The beam irradiation module 252 can adjust the line width of the fine pattern formed on the mask.

The beam irradiation module 252 may be provided as a laser optic module including a laser light source. The beam irradiation module 252 may include a laser sensor 252*a* and a beam expander 252*b*. Additionally, although not shown in FIG. 4, the beam irradiation module 252 may further include a beam splitter, a mirror, etc. on the third optical path 255.

Referring back to FIG. 1, the controller 140 can control the entire operation of the support unit 110, the spray unit 120, and the correction unit 130. In addition, the controller 140 can also control the overall operation of the recovery unit 150 and the elevation unit 160 (e.g., see FIG. 2).

The controller 140 may include a processor that controls each component constituting the substrate processing apparatus 100, a network that communicates wired and wirelessly with each component, one or more instructions related to functions or operations for controlling each component, processing recipes including instructions, and a storage means for storing various data. In addition, the controller 140 may further include a user interface including an input means for the operator to perform command input manipulations to manage the substrate processing apparatus 100, an output means for visualizing and displaying the operation status of the substrate processing apparatus 100, and the like. The controller 140 may be provided as a computing device for data processing and analysis, command transmission, etc.

Instructions may be provided in the form of a computer program or application. A computer program may include one or more instructions and be stored in a computer-readable recording medium. Instructions may include code generated by a compiler, code that can be executed by an interpreter, etc. The storage means may be provided as one or more storage media selected from flash memory, HDD, SSD, card type memory, RAM, SRAM, ROM, EEPROM, PROM, magnetic memory, magnetic disk, and optical disk.

Figure 5:
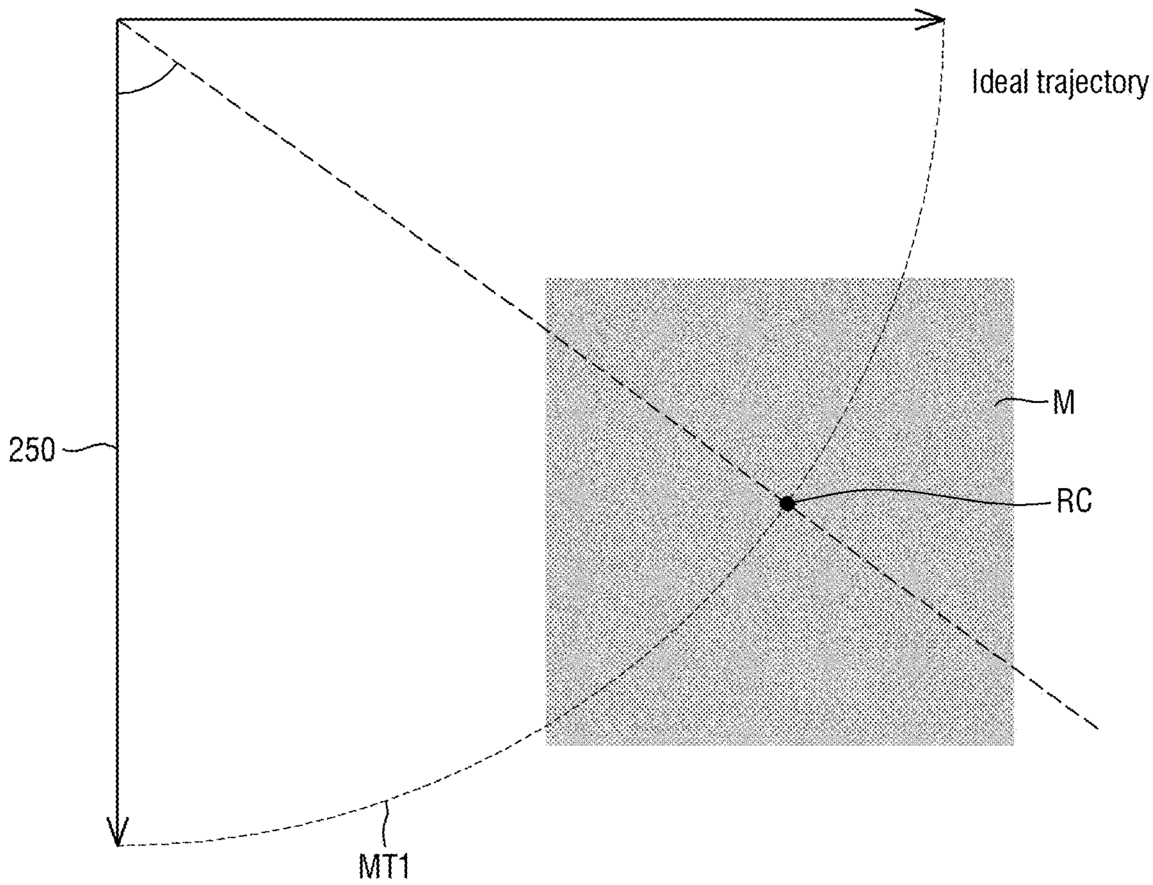
FIG. 5 is a first example diagram for explaining the role of an anchor pattern.
Figure 6:
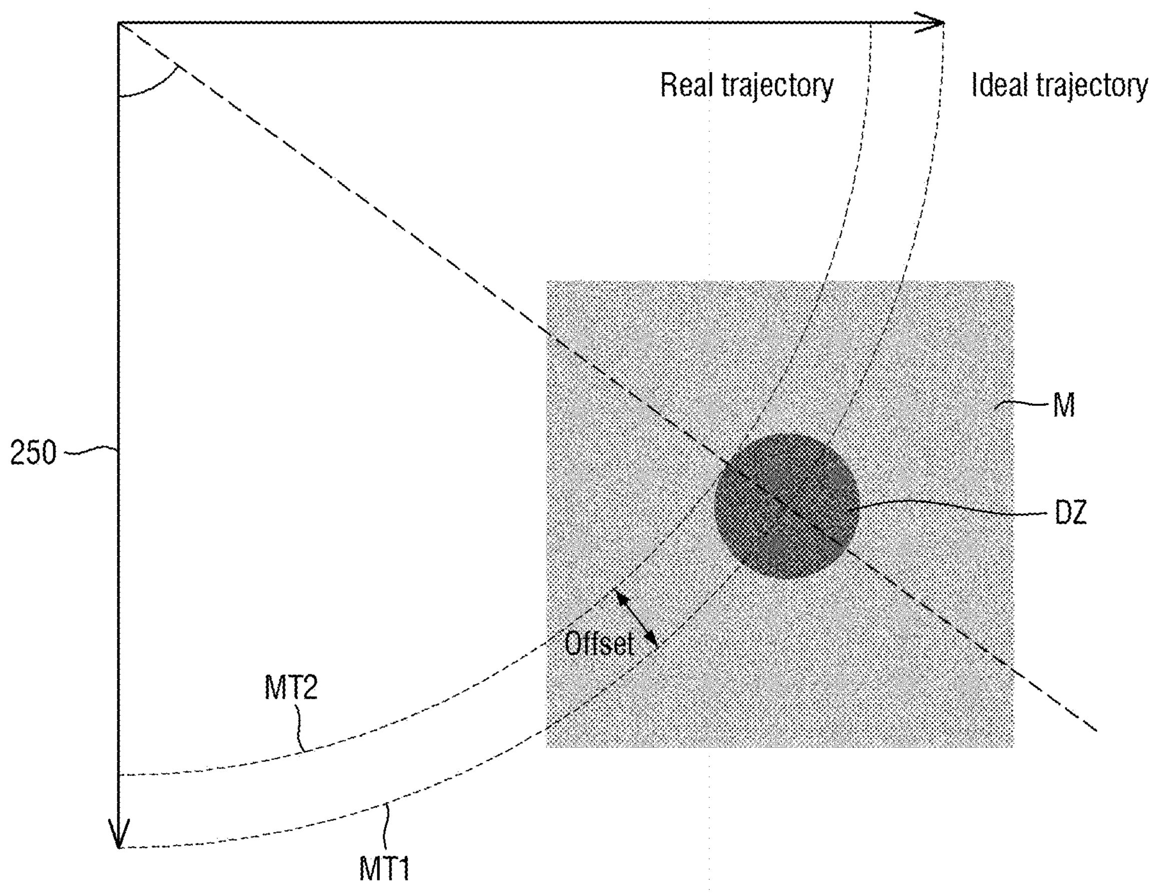
FIG. 6 is a second example diagram for explaining the role of the anchor pattern.

FIG. 5 is a first example diagram for explaining the role of an anchor pattern. FIG. 6 is a second example diagram for explaining the role of the anchor pattern.

Referring to FIGS. 4 to 6, in order for the beam irradiation module 252 to target all points on the mask M, the movement trajectory MT1 of the swing arm 250 should pass through the center of rotation RC of the spin chuck 221 (e.g., see 221 in FIG. 2). If the movement trajectory MT2 of the swing arm 250 does not pass through the rotation center RC of the spin chuck 221, the beam irradiation module 252 cannot target all points on the mask M, and a dead zone DZ that is physically impossible to target may occur on the mask M.

The swing arm 250 may align the laser sensor 252*a* on the mask M using a rotation motor. However, due to the length of the swing arm 250 at the level of hundreds of millimeters (mm), even if a minute error occurs in relation to the absolute position angle of the rotation motor, an error of tens of micrometers (μm) or more may occur on the mask M.

Due to the nature of the rotation motor, the absolute position angle cannot be perfectly corrected with a laser distance meter.

In the present disclosure, in order to solve this problem, the absolute position error of the rotation motor of the swing arm 250 may be corrected using a mask on which a plurality of anchor patterns are formed, and accordingly, the movement trajectory of the swing arm 250 may pass through the rotation center RC of the spin chuck 221. Hereinafter, a mask on which a plurality of anchor patterns are formed is defined as a dummy mask or a dummy substrate. The mask on which a plurality of anchor patterns are formed may also be referred to as a second substrate.

An anchor pattern is a key pattern for correcting absolute position error related to the rotation motor of the swing arm 250. The anchor pattern can correct errors related to the rotation angle of the swing arm 250 and align the movement trajectory of the swing arm 250 with the rotation center RC of the spin chuck 221. The anchor pattern may cause the movement trajectory of the swing arm 250 to pass through the rotation center RC of the spin chuck 221.

Figure 7:
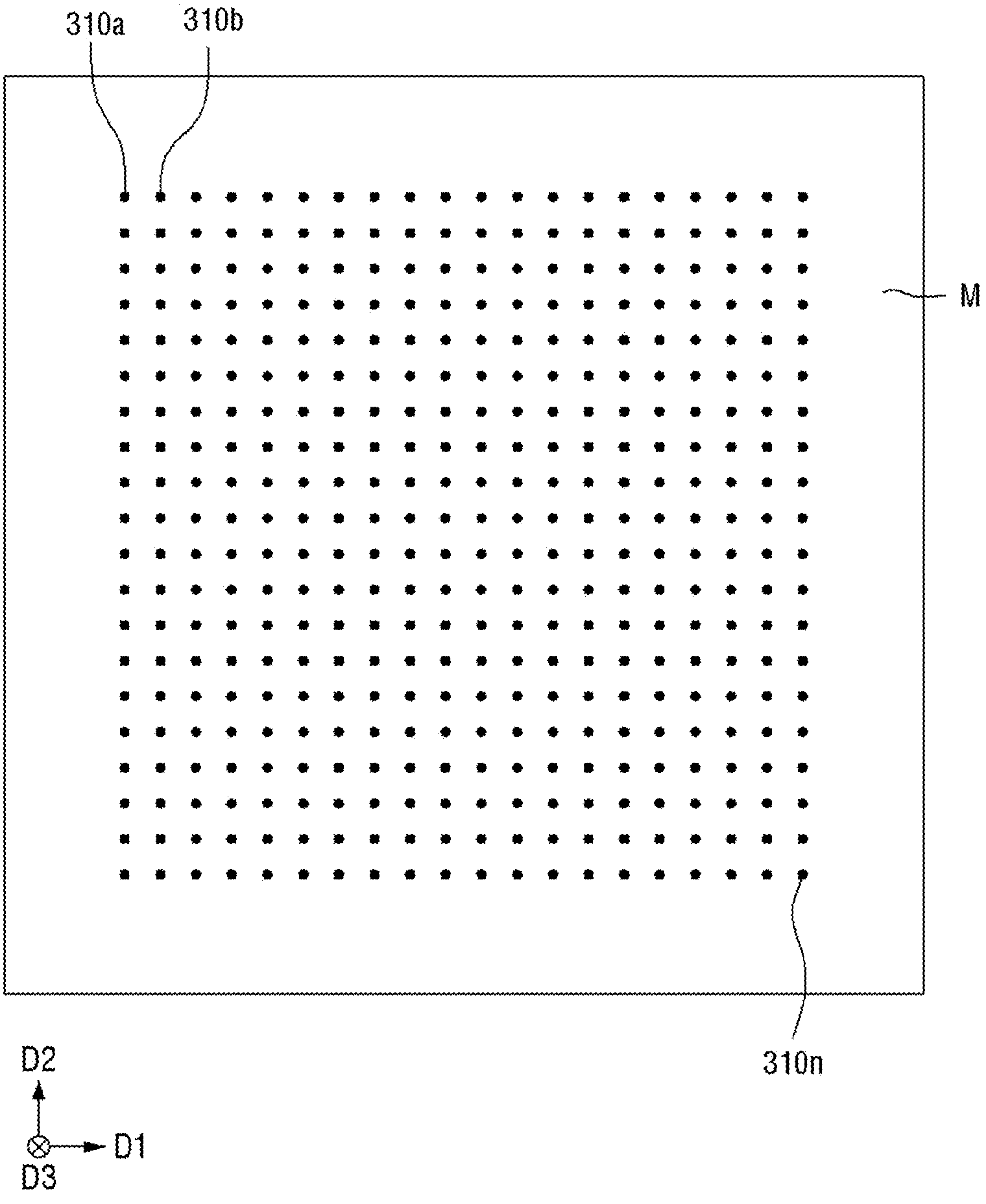
FIG. 7 is an example diagram for explaining the structure of an anchor pattern formed on a mask.

FIG. 7 is an example diagram for explaining the structure of an anchor pattern formed on a mask.

Referring to FIG. 7, a plurality of anchor patterns 310*a*, 310*b*, . . . , 310*n* may be formed on the mask M. The anchor patterns 310*a*, 310*b*, . . . , 310*n* may be arranged in an array of the same pattern. Each of the anchor patterns 310*a*, 310*b*, . . . , 310*n* may be formed in a hemispherical shape, but the present disclosure is not limited thereto, and the anchor patterns 310*a*, 310*b*, . . . , 310*n* may be formed in any shape as long as it can be identified from the image acquired through the image acquisition module 251 (e.g., see FIG. 4).

The anchor patterns 310*a*, 310*b*, . . . , 310*n* may be arranged in an array on the mask M at regular intervals (i.e., may be arranged in an array on the mask M at substantially constant intervals). In some embodiments, the interval between two different anchor patterns may be at the nanometer (nm) level. In some embodiments, the interval between two different anchor patterns may be at the micrometer (m) level. Anchor patterns 310*a*, 310*b*, . . . , 310*n* may be formed on the entire surface of the mask M. However, the present disclosure is not limited thereto, and the anchor patterns 310*a*, 310*b*, . . . , 310*n* may be partially formed on one surface of the mask M. In some embodiments, the anchor patterns 310*a*, 310*b*, . . . , 310*n* may be formed on all or part of both sides of the mask M.

Figure 8:
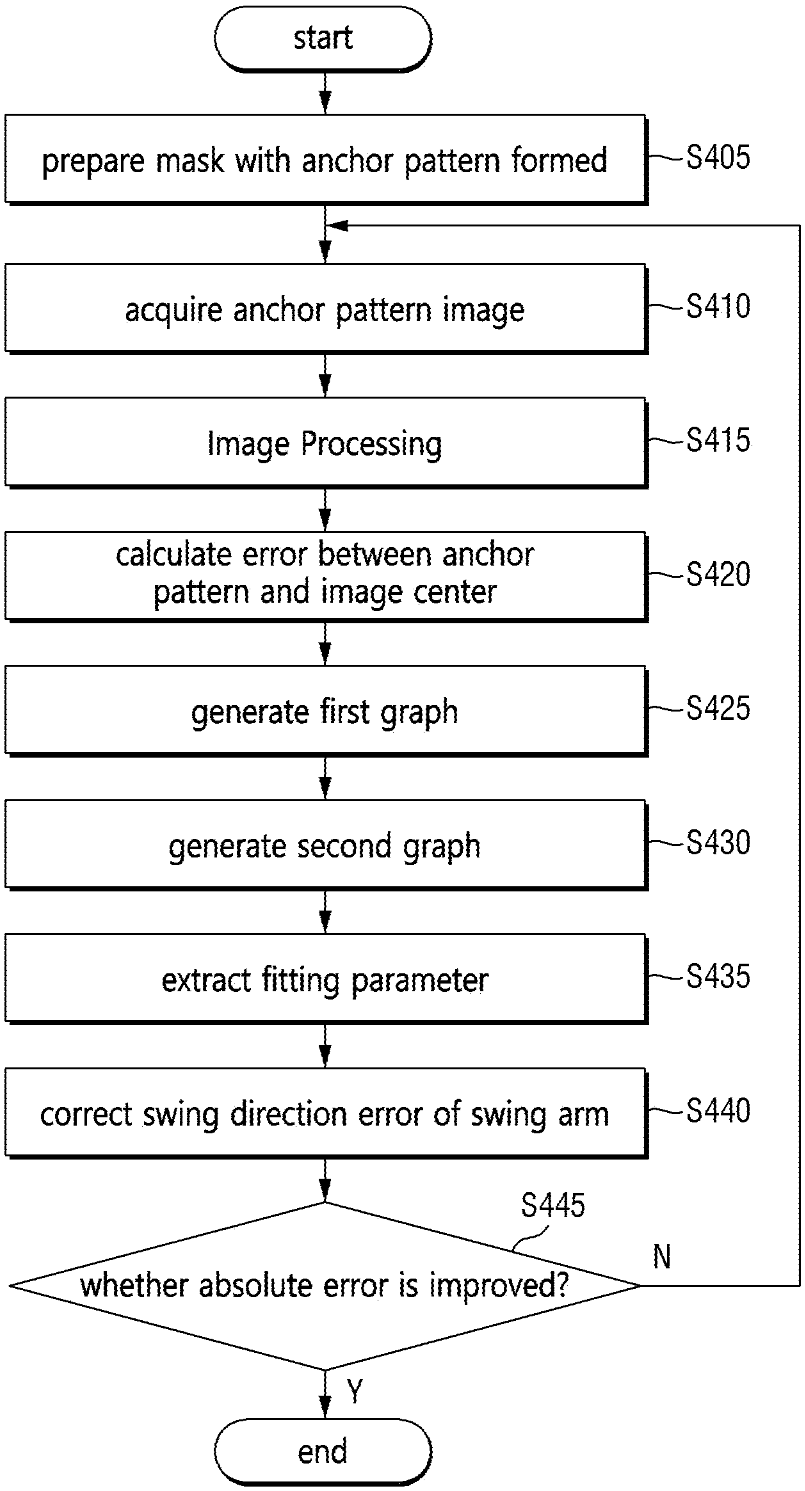
FIG. 8 is a flowchart sequentially explaining a method of compensating for absolute position error related to the rotation motor of the swing arm.

FIG. 8 is a flowchart for sequentially explaining the absolute position error compensation method related to the rotation motor of the swing arm. In particular, FIG. 8 is a flowchart with regard to a method of correcting the absolute position error related to the rotation motor of the swing arm 250 using the mask M on which the anchor patterns 310*a*, 310*b*, . . . , 310*n* are formed.

Referring to FIGS. 1 to 8, the method of correcting the absolute position error for the rotation motor of the swing arm 250 may be performed in the facility setup step or PM (Preventive Maintenance) step. The method may be performed to suppress the occurrence of the dead zone DZ on the mask M.

First, a mask M on which anchor patterns 310*a*, 310*b*, . . . , 310*n* are formed is prepared (S405). A mask with the same pattern engraved in an array on the front is manufactured, and this can be used as a mask M on which anchor patterns 310*a*, 310*b*, . . . , 310*n* are formed.

Afterwards, an image for the mask M is acquired using the image acquisition module 251 (S410). A plurality of anchor patterns 310*a*, 310*b*, . . . , 310*n* may be formed on the mask M, and the coordinate value of each anchor pattern 310*a*, 310*b*, . . . , 310*n* may be determined in advance. In the present disclosure, the rotation center RC of the spin chuck 221 can be detected by using a plurality of anchor patterns 310*a*, 310*b*, . . . , 310*n* as absolute symbols.

The image acquisition module 251 may acquire a plurality of images for the anchor patterns 310*a*, 310*b*, . . . , 310*n*. For example, a plurality of images may be acquired for all of the anchor patterns 310*a*, 310*b*, . . . , 310*n*, such as acquiring an image including several anchor patterns and then acquiring an image including several other anchor patterns. However, the present disclosure is not limited thereto, and it is also possible to acquire an image that includes only one anchor pattern. In this case, the swing arm 250 and the spin chuck 221 are rotated to move to where each anchor pattern 310*a*, 310*b*, . . . , 310*n* is located, and images for each anchor pattern 310*a*, 310*b*, . . . , 310*n* can be obtained. The number of images may be equal to the number of anchor patterns 310*a*, 310*b*, . . . , 310*n*. In some embodiments, it is possible to acquire an image so that all of the anchor patterns 310*a*, 310*b*, . . . , 310*n* are included in one image.

The mask M may not be seated horizontally on the spin chuck 221. In this case, there may be an error between the value detected through the image and the actual value. Therefore, in order to increase the detection accuracy of the rotation center RC of the spin chuck 221, a plurality of images can be acquired while rotating the spin chuck 221. The image acquisition module 251 may acquire a plurality of images while the spin chuck 221 rotates 360 degrees. In this case, the process of rotating the spin chuck 221 at a certain angle and having the image acquisition module 251 acquire one image may be repeated multiple times. The spin chuck 221 may rotate clockwise or counterclockwise.

For example, the spin chuck 221 may be rotated 60 degrees clockwise, and the image acquisition module 251 may acquire the first image. Subsequently, the spin chuck 221 may be rotated 60 degrees clockwise again, and the image acquisition module 251 may acquire the second image. While rotating the spin chuck 221 360 degrees in this manner, the image acquisition module 251 may acquire the first to sixth images.

Afterwards, the controller 140 image processes the image acquired by the image acquisition module 251 (S415), and based on the image processing result, calculates errors between each anchor pattern 310*a*, 310*b*, . . . , 310*n* and the center of the image (S420). The controller 140 may extract the position of the contour or the center point of the anchor patterns 310*a*, 310*b*, . . . , 310*n* from the image through image processing, and calculate how far the corresponding coordinates are from the center of the image to obtain the errors.

The image processing process (S415, S420) by the controller 140 may be performed in the following order. First, the controller 140 removes noise from the image. The controller 140 may remove noise from the image using a morphological processing method, that is, a morphology technique. For example, the controller 140 may remove noise from the image using operations such as erosion and dilation.

Next, the controller 140 enlarges and extracts the anchor patterns 310*a*, 310*b*, . . . , 310*n* from the noise-removed image. The controller 140 may rescale the image from which noise has been removed, set a threshold using a thresholding method, binarize the image, rotate the object in the image, and extract anchor patterns 310*a*, 310*b*, . . . , 310*n* based on the boundaries related to each object. Hereinafter, an image enlarged and extracted to include a contour related to the anchor patterns 310*a*, 310*b*, . . . , 310*n* is defined as an anchor pattern image.

Next, the controller 140 calculates the error between the positions of the anchor patterns 310*a*, 310*b*, . . . , 310*n* and the center of the image. The controller 140 calculates the position of the anchor patterns 310*a*, 310*b*, . . . , 310*n* based on the contour related to the anchor patterns 310*a*, 310*b*, . . . , 310*n*, and compares the calculated position with the center of the image to calculate the error. The center of the image may be the vision center of the camera sensor 251*a* located within the image acquisition module 251.

After image processing, the controller 140 generates a first graph based on the error between the positions of the anchor patterns 310*a*, 310*b*, . . . , 310*n* and the center of the image (S425). The error between the positions of the anchor patterns 310*a*, 310*b*, . . . , 310*n* and the center of the image may represent a swing direction error of the swing arm 250. The first graph may indicate how much the swing direction error of the swing arm 250 occurs depending on the rotation angle of the swing arm 250. For example, the first graph may be generated as shown in FIG. 9.

Figure 9:
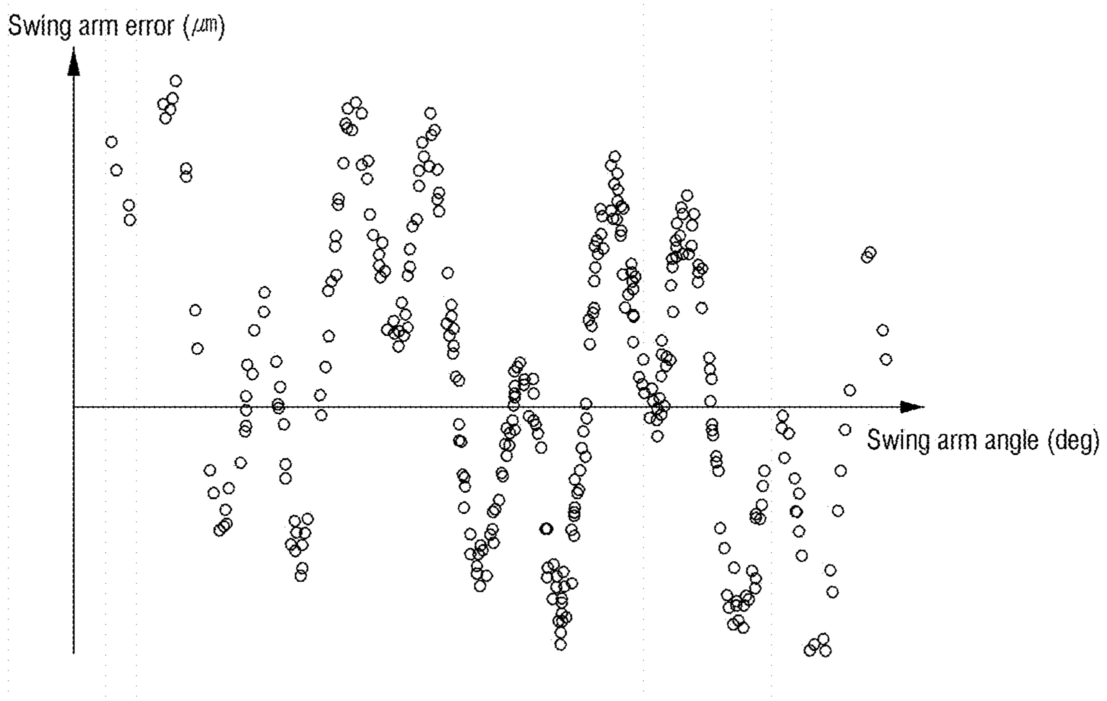
FIG. 9 is an example diagram for further explaining the first graph generation step in the absolute position error compensation method of the swing arm.

FIG. 9 is an example diagram for further explaining the first graph generation step in the absolute position error compensation method of the swing arm.

Referring to FIG. 9, "Swing arm error" refers to the swing direction error of the swing arm 250, and can be expressed in distance units (e.g., m). "Swing arm angle" refers to the rotation angle of the swing arm 250 and can be expressed in angle units (Deg). The first graph represents the relationship between the rotation angle of the swing arm 250 and the swing direction error of the swing arm 250.

Figure 10:
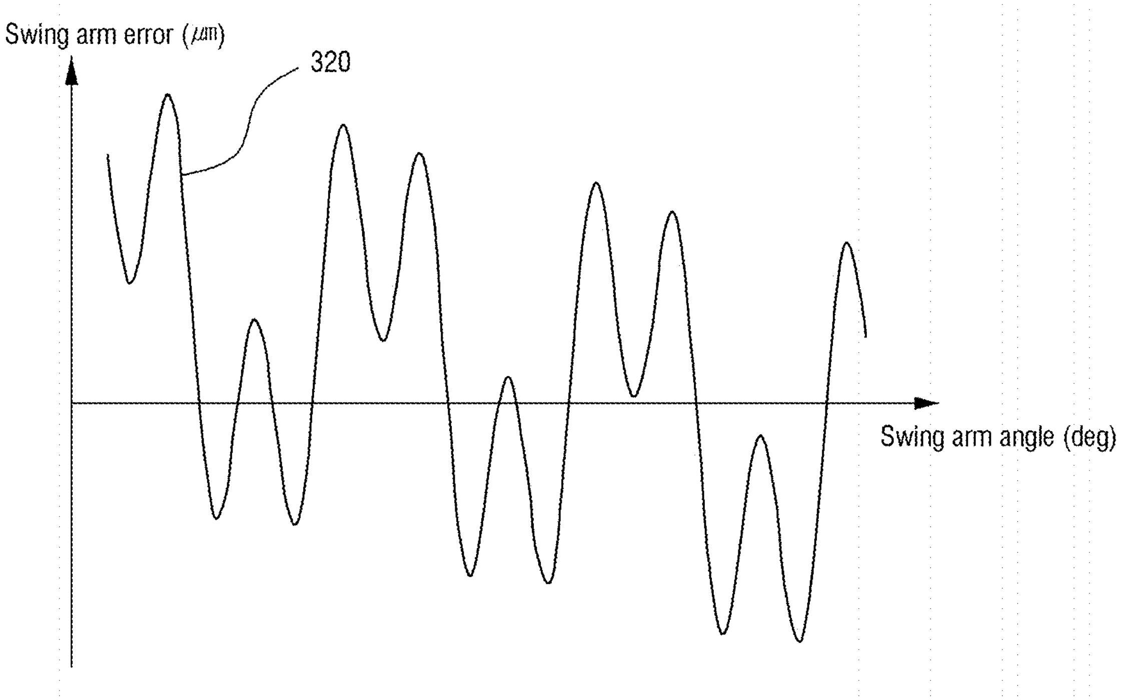
FIG. 10 is an example diagram for further explaining the second graph generation step in the absolute position error compensation method of the swing arm.

FIG. 10 is an example diagram for further explaining a second graph generation step in the absolute position error compensation method of the swing arm.

Referring to FIGS. 8 and 10, the controller 140 generates a waveform curve 320 based on the swing direction error of the swing arm 250 distributed according to the rotation angle of the swing arm 250, and generates a second graph including the waveform curve 320 (S430). For example, the controller 140 may generate the second graph including the waveform curve 320 as shown in FIG. 10.

Afterwards, the controller 140 extracts fitting parameters based on the waveform curve 320 shown in the second graph (S435). The swing direction error of the swing arm 250 occurs in a sine wave shape, and correction parameters can be extracted through curve fitting by designing a fitting formula similar to Fourier Series Expansion.

The controller 140 may extract fitting parameters using an error correction model. The error correction model is a RAC (rotation accuracy correction) model and can be prepared to correct the swing direction error of the swing arm 250. The error correction model can be expressed as a sinusoidal function that is interpreted as a sine wave to express the swing direction error of the swing arm 250. The controller 140 may calculate a function related to the waveform curve 320 and design an error correction model based on the function.

The error correction model can be designed based on Fourier Transform. The controller 140 may perform Fourier Transform on a function related to the waveform curve 320. The controller 140 may perform Fast Fourier Transform (FFT) on the function. For example, the result obtained by Fourier Transform is shown in FIG. 11.

Figure 11:
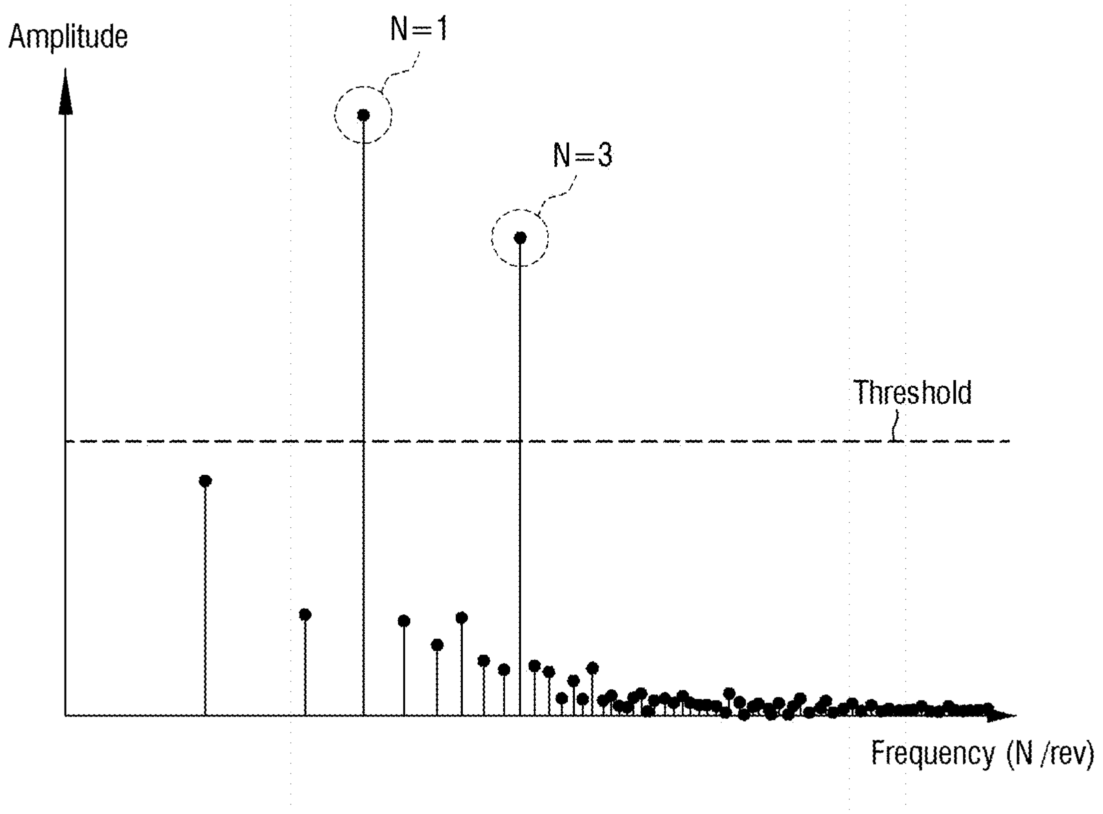
FIG. 11 is a first example diagram for explaining the error correction step in the absolute position error compensation method of the swing arm.

FIG. 11 is a first example diagram for explaining the error correction step in the absolute position error compensation method of the swing arm.

Referring to FIG. 11, the controller 140 can determine Nmax and generate an error correction model based on the results obtained by Fourier Transform. The controller 140 may design an error correction model as the following equations.

$$\theta_{real} = \theta_{target} - \delta\theta(\theta_{target}) \quad \text{Equation 1}$$

$$\delta\theta(\theta) = a + b\theta + \sum_N c_N \sin(Nf\theta + e_N) \quad \text{Equation 2}$$

In Equation 1 and Equation 2, $\theta_{real}$ means the angle value of the swing arm 250 where the actual desired pattern is located, that is, the value to which the actual swing arm 250 should go. $\theta_{target}$ refers to the angle value of the swing arm 250 where the desired pattern is located calculated before applying RAC. 60(0) is the error value between $\theta_{target}$ and $\theta_{real}$, which means the value to be corrected with RAC. 'a' is the first fitting parameter and means a parameter related to the constant offset correction value of the swing arm 250. 'b' is the second fitting parameter and means a parameter related to the linear correction value of the swing arm 250. θ means the current angle of the swing arm 250. In the present disclosure, θ may mean $\theta_{target}$ calculated before RAC correction. N stands for Fourier Harmonic Order. N is the order of the Sinusoidal Term, and in the present disclosure, a value exceeding the threshold is selected by Fourier transforming the measured error result. $c_N$ is the third fitting parameter, which may correspond to the amplitude or intensity of the Nth sinusoidal term. 'f' is the fourth fitting parameter, which may correspond to the fundamental frequency, which is the frequency of the first sinusoidal term. $e_N$ is the fifth fitting parameter, and may correspond to the phase of the Nth sinusoidal term.

Referring back to FIGS. 1 to 8, thereafter, the controller 140 corrects the swing direction error of the swing arm 250 based on the fitting parameters (S440). Here, the swing direction error of the swing arm 250 means an absolute position error related to the rotation motor of the swing arm 250. The controller 140 may detect the rotation angle of the swing arm 250 related to the target coordinates, calculate the swing direction error generated with respect to the detected rotation angle of the swing arm 250 using a fitting parameter, and correct the difference value.

The controller 140 may correct the swing direction error of the swing arm 250 using data regression analysis. For example, the controller 140 may correct the swing direction error of the swing arm 250 using curve fitting. The controller 140 may correct the swing direction error of the swing arm 250 by performing curve fitting on the waveform curve 320 based on the error correction model (e.g., see FIG. 10).

After moving the swing arm 250 to the $\theta_{target}$ position calculated before applying RAC, the position of the pattern can be measured using the camera sensor 251*a* to measure the error value $\delta\theta$ ($\theta_{target}$). If this is repeated for hundreds of points of $\theta_{target}$, $\delta\theta$ ($\theta_{target}$) values can be obtained for several $\theta_{target}$, and the error value data thus obtained can be curve-fitted with the RAC model expressed in Equation 1 and Equation 2. When performing curve fitting, Fourier Transform is first performed to determine the Fourier order N by checking peaks that exceed the set threshold, and then curve fitting is performed using the fitting parameters to extract optimal parameter values.

The controller 140 may correct the swing direction error of the swing arm 250 using a sine function. The controller 140 may determine the order of the sine function based on the result obtained by Fourier Transform. The controller 140 may calculate the number of values exceeding the threshold and determine the order of the sine function according to the number.

Figure 12:
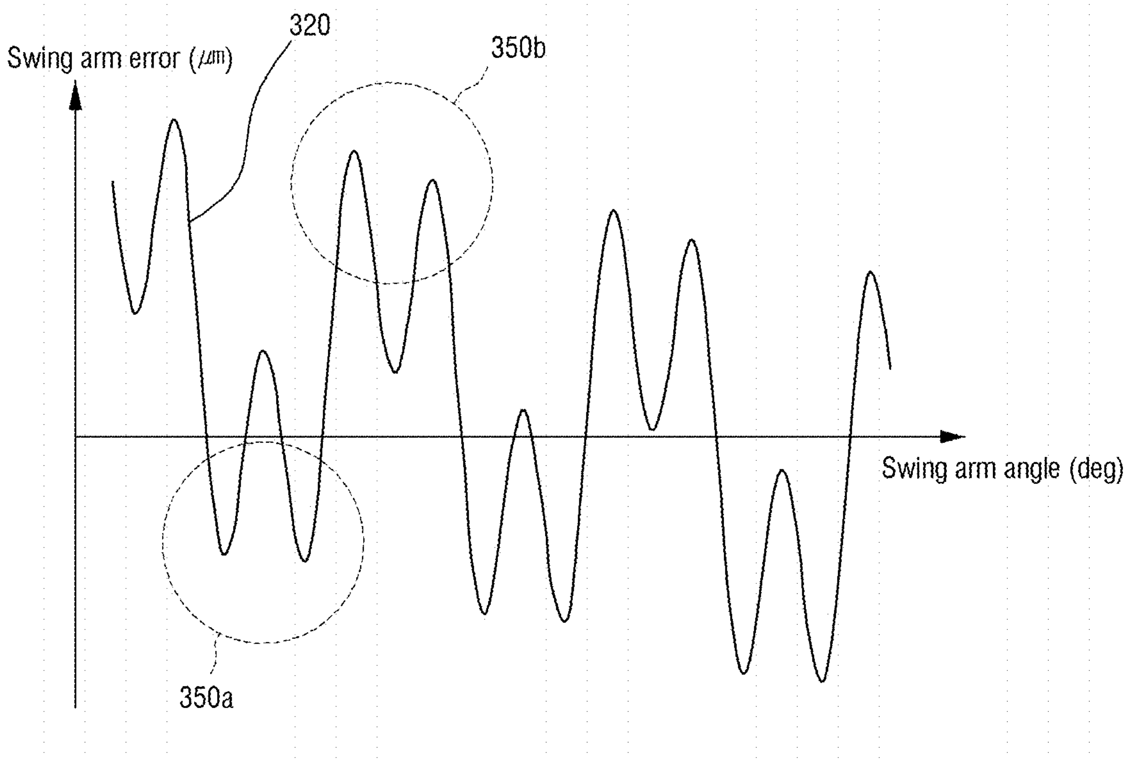
FIG. 12 is a second example diagram for explaining the error correction step in the absolute position error compensation method of the swing arm.

FIG. 12 is a second example diagram for explaining the error correction step in the absolute position error compensation method of the swing arm.

Referring to FIGS. 11 and 12, there are two N values that exceed the threshold (N=1, 3), and accordingly, the controller 140 may use the secondary sine functions 350*a* and 350*b* as shown in FIG. 12 to correct the swing direction error of the swing arm 250.

Referring back to FIGS. 1 to 8, after correcting the swing direction error of the swing arm 250, the controller 140 may measure the swing direction error of the swing arm 250 again using the mask M on which the anchor patterns 310*a*, 310*b*, . . . , 310*n* are formed. The controller 140 may repeat steps S410 to S440 until the swing direction error no longer occurs (S445). For example, the controller 140 may repeat steps S410 to S440 until there is no N value exceeding the threshold in the result obtained by Fourier Transform (S445) (e.g., see FIG. 11).

The controller 140 may check whether the absolute position error has been improved by comparing the previous measurement error and the final measurement error. The controller 140 may pre-correct the swing direction error using the fitting parameter to verify whether the fitting parameter actually helped improve the error (S440), and then obtains the final improved absolute position error through re-measurement.

The swing arm 250 with the laser module and vision module attached is attached to a rotation-type motor. The absolute positioning accuracy of the rotation-type motor may be ±45 arcsec, which occurs an error of several tens of micrometers (m) on the mask pattern. The rotation-type motor has a built-in encoder in which electromagnets are repeatedly arranged. Due to this repetitive structure, absolute position errors that occur depending on the angle also occur repeatedly in a sinusoidal form.

To correct this error (sinusoidal error), a mask with a pattern array engraved with nanometer (nm) level precision is prepared, it is checked how distorted the pattern is on the vision image after the equipment is controlled based on the design coordinates and moved. The present disclosure can achieve the effect of reducing absolute position error to the equipment vibration level in relation to the rotation-type motor that operates the swing arm 250.

The present disclosure can be applied to wet etching equipment, wet cleaning equipment, etc. The present disclosure can be applied to precise targeting of a target point on a mask using a laser in wet etching equipment, wet cleaning equipment, etc. However, the present disclosure is not limited thereto, and the present disclosure can be extended and applied to any equipment equipped with a swing arm and a rotation chuck.

Aspects of the present disclosure may take the form of an entirely hardware embodiment, an entirely software embodiment, or an embodiment combining software and hardware aspects. It will be understood that the terms "comprises", "comprising", "includes", "including", "has", "having" and any other variations thereof specify the presence of the stated features, steps, operations, elements, components, and/or groups but do not preclude the presence or addition of one or more other features, steps, operations, elements, components, and/or groups thereof.

Although example embodiments of the present disclosure have been described above with reference to the accompanying drawings, those skilled in the art to which the present disclosure pertains will understand that the present disclosure can be practiced in other specific forms without changing the technical concept or features. Therefore, the example embodiments described above should be understood as illustrative in all respects and not limiting.

What is claimed is:

1. An apparatus for processing a substrate, the apparatus comprising:
- a support unit configured to support and rotate a first substrate, the support unit including a spin chuck;
- a spray unit configured to spray a processing fluid on the first substrate;
- a correction unit on a swing arm and configured to irradiate a beam onto the first substrate when the processing fluid is provided on the first substrate, wherein the swing arm is adjacent to the spin chuck and is configured to move the correction unit to a target point on the first substrate; and
- a controller configured to control the spin chuck and the swing arm, and correct a position error of the swing arm using a second substrate,
- wherein a plurality of anchor patterns are on the second substrate.

2. The apparatus of claim 1, wherein the position error of the swing arm is an error related to a motor that is configured to rotate the swing arm.

3. The apparatus of claim 1, wherein each of the anchor patterns has a predetermined coordinate value.

4. The apparatus of claim 1, wherein the anchor patterns have a same shape and are spaced apart from each other by a regular interval.

5. The apparatus of claim 4, wherein the regular interval between two of the anchor patterns is less than 1 micrometer.

6. The apparatus of claim 1, wherein the controller is configured to perform image processing on an image including at least one of the anchor patterns, and correct the position error of the swing arm based on a result obtained from the image processing.

7. The apparatus of claim 6, wherein the controller is configured to correct the position error of the swing arm based on an error between a position of the at least one of the anchor patterns in the image and a center of the image.

8. The apparatus of claim 6, wherein the image processing comprises enlarging the image, rotating the image, and extracting boundary values within the image.

9. The apparatus of claim 1, wherein the controller is configured to generate a first graph based on a rotation angle of the swing arm and a swing direction error of the swing arm, and correct the position error of the swing arm based on the first graph.

10. The apparatus of claim 9, wherein the controller is configured to generate a second graph including a waveform curve related to the swing direction error of the swing arm, and correct the position error of the swing arm based on the second graph.

11. The apparatus of claim 1, wherein the controller is configured to extract a fitting parameter based on a swing direction error of the swing arm according to a rotation angle of the swing arm, and correct the position error of the swing arm based on the fitting parameter.

12. The apparatus of claim 11, wherein the controller is configured to extract the fitting parameter using an error correction model, and
- wherein the controller is configured to obtain the error correction model by Fourier transforming a function related to the swing direction error.

13. The apparatus of claim 1, wherein the controller is configured to correct the position error of the swing arm using data regression analysis.

14. The apparatus of claim 13, wherein the controller is configured to correct the position error of the swing arm through curve fitting using an error correction model.

15. The apparatus of claim 1, wherein the controller is configured to verify whether the position error of the swing arm has been corrected.

16. The apparatus of claim 15, wherein the controller is configured to correct the position error of the swing arm and then remeasure the position error of the swing arm to verify whether the position error of the swing arm has been corrected.

17. The apparatus of claim 1, wherein the controller is configured to correct the position error of the swing arm using a sine function.

18. The apparatus of claim 17, wherein the controller is configured to extract at least one value exceeding a threshold value based on a result obtained by Fourier transforming a function related to a swing direction error of the swing arm according to a rotation angle of the swing arm, and
- wherein the controller is configured to determine an order of the sine function according to a number of extracted values that exceed the threshold value to correct the position error of the swing arm.

19. A control device configured to control a spin chuck and a swing arm, the spin chuck configured to support and rotate a first substrate, and the swing arm configured to move to a target point on the first substrate,
- wherein the control device is further configured to:
- correct a position error of the swing arm using a second substrate having a plurality of anchor patterns thereon,
- generate an error correction model by Fourier transforming a function related to a swing direction error of the swing arm according to a rotation angle of the swing arm,
- extract a fitting parameter using the error correction model, and
- further correct the position error of the swing arm through curve fitting based on the fitting parameter.

20. An apparatus for processing a substrate, the apparatus comprising:
- a support unit configured to support and rotate a first substrate, the support unit including a spin chuck;
- a spray unit configured to spray a processing fluid on the first substrate;
- a correction unit on a swing arm and configured to irradiate a beam onto the first substrate when the processing fluid is provided on the first substrate, wherein the swing arm is adjacent to the spin chuck and is configured to move the correction unit to a target point on the first substrate; and
- a controller configured to:
- control the spin chuck and the swing arm,
- correct a position error of the swing arm using a second substrate having a plurality of anchor patterns thereon,
- generate an error correction model by Fourier transforming a function related to a swing direction error of the swing arm according to a rotation angle of the swing arm, extract a fitting parameter using the error correction model, further correct the position error of the swing arm through curve fitting based on the fitting parameter, and verify whether the position error of the swing arm has been corrected, wherein each of the anchor patterns has a predetermined coordinate value.

* * * * *